United States Patent
Stark et al.

(10) Patent No.: US 10,073,727 B2
(45) Date of Patent: Sep. 11, 2018

(54) HEAP MANAGEMENT FOR MEMORY CORRUPTION DETECTION

(71) Applicant: Intel Corporation, Santa Clara, CA (US)

(72) Inventors: Tomer Stark, Nesher (IL); Ady Tal, Zichron Yaacove (IL); Ron Gabor, Hertzliya (IL)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 14/635,896

(22) Filed: Mar. 2, 2015

(65) Prior Publication Data
US 2016/0259682 A1     Sep. 8, 2016

(51) Int. Cl.
*G06F 11/10*     (2006.01)
*G06F 11/07*     (2006.01)

(52) U.S. Cl.
CPC .......... *G06F 11/079* (2013.01); *G06F 11/073* (2013.01); *G06F 11/0751* (2013.01); *G06F 11/0772* (2013.01); *G06F 11/10* (2013.01); *G06F 11/1064* (2013.01)

(58) Field of Classification Search
CPC ............... G06F 11/073; G06F 11/0751; G06F 11/0772; G06F 11/1064
See application file for complete search history.

(56) References Cited

U.S. PATENT DOCUMENTS

| | | | |
|---|---|---|---|
| 7,930,491 B1 * | 4/2011 | Xu | G06F 11/3648 711/154 |
| 8,510,596 B1 * | 8/2013 | Gupta | G06F 11/073 714/15 |
| 9,619,313 B2 | 4/2017 | Stark et al. | |
| 9,652,375 B2 | 5/2017 | Stark et al. | |
| 2007/0055837 A1 | 3/2007 | Rajagopal et al. | |
| 2007/0136385 A1 | 6/2007 | Abrashkevich | |

(Continued)

FOREIGN PATENT DOCUMENTS

EP    0652515 A1 *   5/1995   ........... G11C 29/006

OTHER PUBLICATIONS

International Search Report and Written Opinion for International Patent Application No. PCT/US2016/014180, dated Jul. 11, 2016, 15 pages.

(Continued)

*Primary Examiner* — Yolanda L Wilson
(74) *Attorney, Agent, or Firm* — Lowenstein Sandler LLP

(57) ABSTRACT

Memory corruption detection technologies are described. A method can include receiving, from the application, an allocation request for an allocation of one or more contiguous memory blocks of the memory for a memory object. The method can further include allocating, by a processor, the one or more contiguous memory blocks for the memory object in view of a size of the memory object requested. The method can further include writing, into a MCD table, a first memory corruption detection (MCD) unique identifier associated with the one or more contiguous memory blocks. The method can further include creating a pointer with a memory address of the memory object and a second MCD unique identifier associated with the memory object. The method can further include sending, to the application, the pointer.

20 Claims, 12 Drawing Sheets

(56) References Cited

U.S. PATENT DOCUMENTS

| | | |
|---|---|---|
| 2008/0320336 A1 | 12/2008 | Qadir |
| 2009/0249289 A1 | 10/2009 | Akritidis et al. |
| 2010/0162038 A1 | 6/2010 | Hulbert et al. |
| 2011/0145536 A1 | 6/2011 | Zachmann |
| 2011/0145632 A1 | 6/2011 | Waldspurger et al. |
| 2011/0173399 A1 | 7/2011 | Chen et al. |
| 2012/0131257 A1 | 5/2012 | Rudosky et al. |
| 2012/0137167 A1 | 5/2012 | Leischner |
| 2013/0013843 A1* | 1/2013 | Radovic ............... G06F 11/073 711/5 |
| 2013/0024631 A1* | 1/2013 | Balasubramanian ....................... G06F 21/566 711/154 |
| 2013/0036332 A1* | 2/2013 | Gove ................... G06F 21/52 714/54 |
| 2013/0097356 A1 | 4/2013 | Dang et al. |
| 2013/0173954 A1* | 7/2013 | Woo ..................... G06F 11/167 714/6.13 |
| 2013/0272193 A1* | 10/2013 | Wu ....................... H04W 4/001 370/328 |
| 2013/0283105 A1 | 10/2013 | Balasubramanian |
| 2013/0318322 A1 | 11/2013 | Shetty et al. |
| 2013/0318405 A1 | 11/2013 | Korah et al. |
| 2014/0115283 A1* | 4/2014 | Radovic ................ G06F 12/16 711/162 |
| 2014/0122826 A1* | 5/2014 | Jacob ................... G06F 11/073 711/203 |
| 2014/0173356 A1 | 6/2014 | Burghard |
| 2014/0281336 A1 | 9/2014 | Solihin |
| 2015/0106588 A1 | 4/2015 | Godard et al. |
| 2015/0127972 A1 | 5/2015 | Chun et al. |
| 2015/0278103 A1* | 10/2015 | Radovic .............. G06F 12/0891 711/144 |
| 2016/0124802 A1 | 5/2016 | Gabor et al. |
| 2016/0259682 A1 | 9/2016 | Stark et al. |
| 2016/0283300 A1 | 9/2016 | Stark et al. |
| 2016/0371139 A1* | 12/2016 | Stark .................... G06F 11/0787 |
| 2016/0371179 A1 | 12/2016 | Stark et al. |
| 2017/0185535 A1 | 6/2017 | Stark et al. |

OTHER PUBLICATIONS

Office Action for Taiwan Patent Application No. 105105126, 21 pages, dated Oct. 31 2016.

* cited by examiner

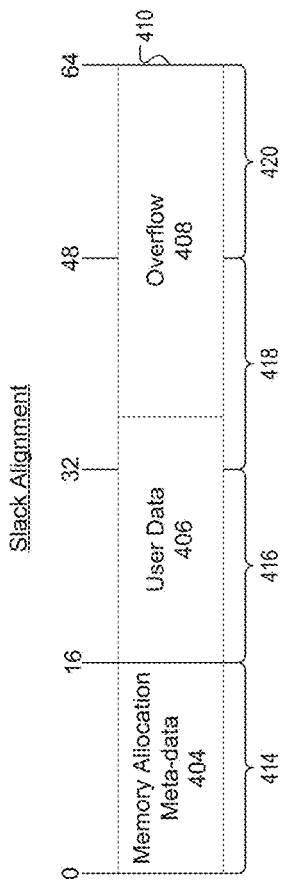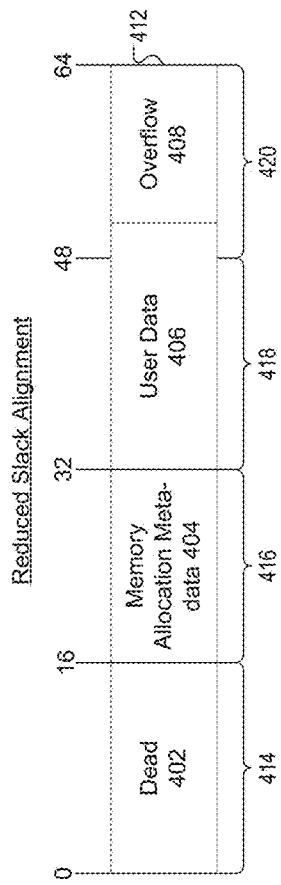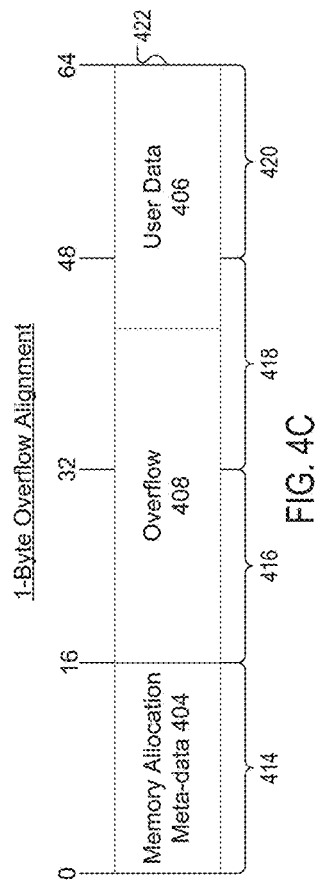

HEAP MANAGEMENT FOR MEMORY CORRUPTION DETECTION

BACKGROUND

Memory corruption can be a major resource issue leading to system malfunctions and can negatively impact a performance of a system. Memory corruption can arise from a variety of causes, including: programming errors, out-of-bound accesses, dangling pointers, and malicious attacks on memory. Use of corrupted memory contents in a computer program may cause the computer program crash or to act abnormally. Software solutions may be used for memory corruption detection, such as debugging tools. However, the software solutions may cause a computer program to run significantly slower and can be difficult to use in debugging the computer program.

BRIEF DESCRIPTION OF THE DRAWINGS

FIG. 4A illustrates a contiguous memory block with a slack alignment according to one embodiment.

FIG. 4B illustrates a contiguous memory block with a reduced slack alignment according to one embodiment.

FIG. 4C illustrates a contiguous memory block with a 1-byte overflow alignment according to one embodiment.

DESCRIPTION OF EMBODIMENTS

Figure 1:
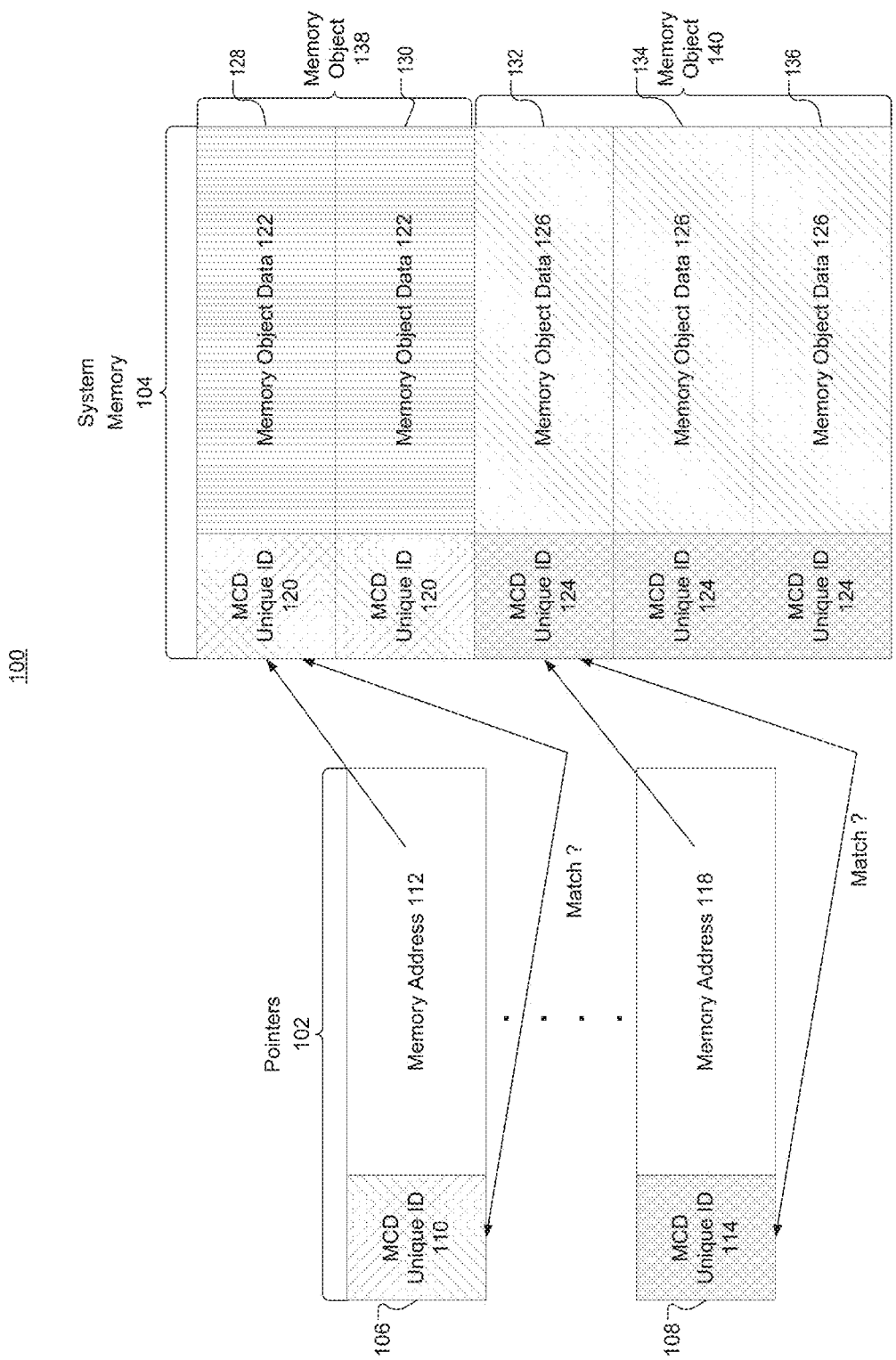
FIG. 1 illustrates a memory corruption detection (MCD) system according to one embodiment.

Memory corruption can occur when the contents of a memory location are accessed. The contents in the memory location can be unintentionally accessed because of programming errors or intentionally modified because of a malicious attack. There can be a variety of different causes of memory corruption. One cause of memory corruption can be a coding error, where an application erroneously writes into or reads unintended memory blocks of a system memory. Another cause of memory corruption can be when an application uses an invalid pointer to write data into a memory block that has been freed. Another cause of memory corruption can be when an application attempts to write data into a memory block header (or other restricted or reserved memory regions) that may be managed by the operating system (OS). A variety of other causes of memory corruption may exist. Use of corrupted memory can lead to data corruption (e.g. database system corrupted content), memory management problems, and cause performance degradation, unpredictable program execution, or program crashes. Traditionally, memory corruption for large and complex software can be difficult to test for and can lead to program errors and security vulnerabilities going undetected until a problem arises.

Embodiments described herein may address the above noted deficiencies by using a memory corruption detection architecture that manages heap memory of a program. Heap memory is an area of reserved memory that a program or application can use to store data in a variable amount that may be used when a program is running. For example, an application may receive different amounts or types of input data for processing (such as from different users) and store the input data in heap memory. The application can process the different amounts or types of input data as the application may be running. An allocation library can be used for memory allocations, freeing of memory, and memory corruption detection (MCD) data management. To prevent incidents of the memory corruption, a processing system or processor may be operable to validate pointers produced by memory access instructions of applications being executed by the processing system or processor. In one example, the processing system may maintain a metadata table that stores identifiers for different allocated buffers (e.g., memory allocations) including one or more contiguous memory blocks of a system memory. In another example, the contiguous memory blocks of the system memory can be a same pre-defined size, such as 64 bytes (B) or 32 B. In another example, the contiguous memory blocks of the system memory can different sizes.

When a portion of memory of the processor may be allocated for a newly created memory object, a unique identifier (ID) may be generated and associated with one or more contiguous memory blocks that can store data written to the memory object. The unique identifiers for the contiguous memory blocks may be MCD unique identifiers or MCD color designations. For example, contiguous memory blocks allocated for a memory object can be assigned a MCD color value, such as a 6 bit metadata value.

The MCD unique identifiers for different memory objects may be stored in one or more MCD table entries of a MCD table that correspond to the contiguous memory blocks being allocated for the memory objects. An MCD unique identifier may also be stored in one or more bits (e.g., upper bits) of a pointer that can be returned by a memory allocation routine to an application that has requested a memory allocation. When the processor receives a memory access instruction, the processor may compare a MCD unique identifier retrieved from the MCD table to a MCD unique identifier extracted from the pointer specified by the memory access instruction. When the MCD unique identifiers do not match, a page may be generated.

FIG. 1 illustrates a MCD system 100 according to one embodiment. The MCD system 100 can include pointers 102 and a system memory 104. The pointers 102 can include a MCD unique ID field or MCD color value field 110 and a memory address field. For example, pointer 106 can include a MCD Unique ID 110 and a memory address 112 and pointer 108 can include a MCD unique ID 114 and a memory address 118. The MCD unique IDs 110 and 114 can be stored in one or more bits (such as upper bits, which may not be part of the linear address) of the pointers 106 and 108, respectively. The memory addresses 112 and 118 can reference beginning address locations of memory objects 138 and 140 in the system memory 104. For example, memory address 112 can reference an address location to contiguous memory block 128 and memory address 118 can reference an address location to contiguous memory block 132. The memory objects 138 and 140 can include one or more contiguous memory blocks. For example, memory object 138 can include contiguous memory blocks 128 and 130 and memory object 140 can include contiguous memory blocks 132, 134, and 136. When a portion of the system memory 104 may be allocated to newly created memory objects 138 and 140 for memory object data 122 and 126, a memory allocation routine (e.g., by a calloc routine, a malloc routine, or a realloc routine) may generate MCD unique IDs 120 and 124 to be associated with the contiguous memory blocks 128-130 and 130-136, respectively.

The MCD system 100 may receive a memory access instruction from an application requesting object data of a contiguous memory block. For example, MCD system 100 may receive a memory access instruction, where the memory access instruction includes the pointer 106 with a memory address 112 indicating a beginning location of the object data 122 at contiguous memory block 128. When executing the memory access instruction, the MCD system 100 can compare the MCD unique ID 110 of the pointer 106 with the MCD unique ID 120 of the contiguous memory block 128. When the MCD unique ID 110 matches the MCD unique ID 120, the MCD system 100 may communicate the object data 122 to the requesting application. The MCD system 100 can iterate through the contiguous memory blocks 128 and 130 of memory object 138 until the MCD system 100 reaches the contiguous memory block 132. The MCD system 100 can determine that it has reached the end of the contiguous memory blocks 128 and 130 when the MCD unique ID 124 that does not match the MCD unique ID 110. When the MCD unique ID 124 does not match the MCD unique ID 110, the MCD system 100 may generate a fault message (such as an exception) indicating that the end of memory object 138 has been reached.

Figure 2:
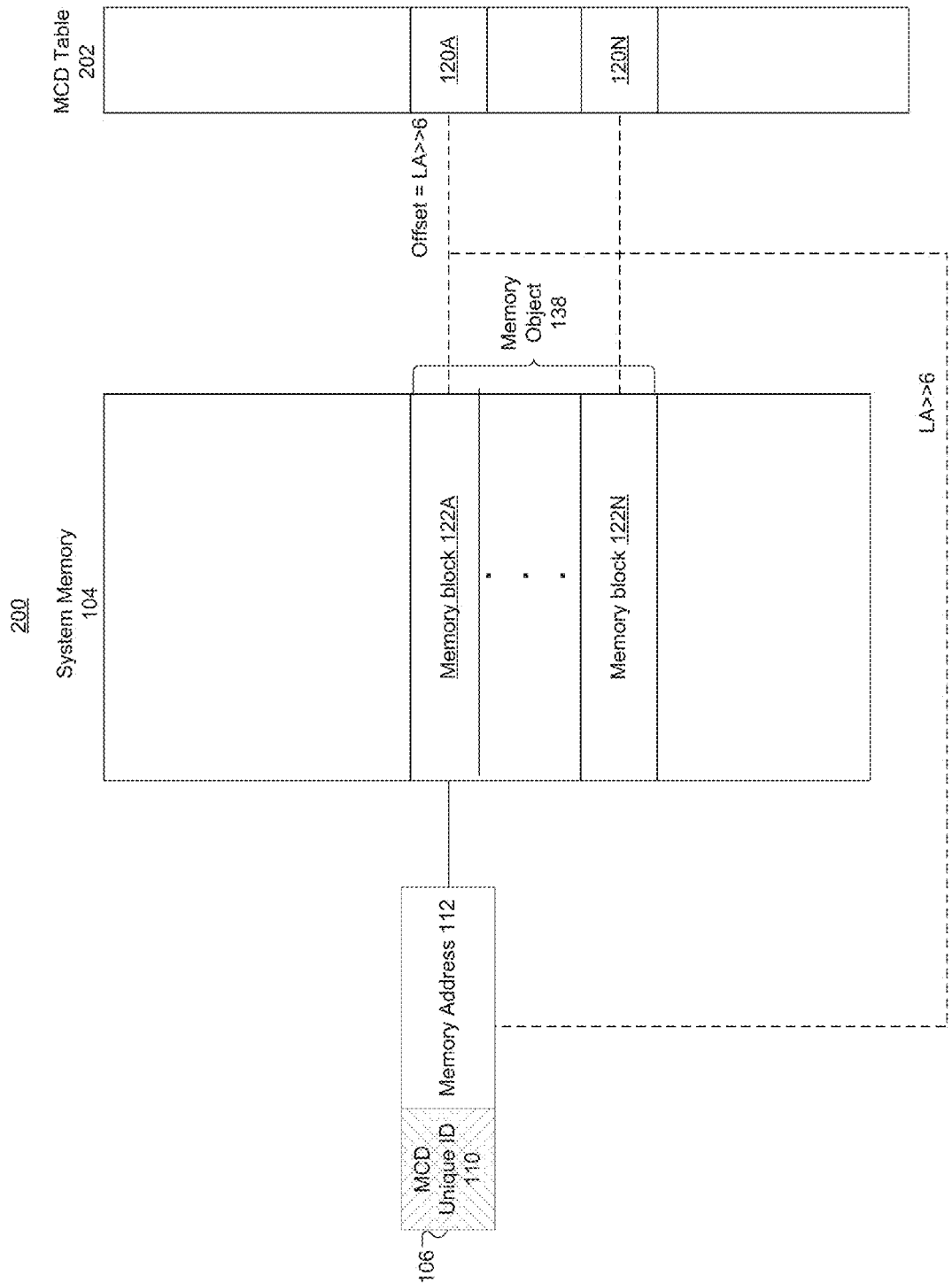
FIG. 2 illustrates an architecture of an MCD system with a system memory and a MCD table according to one embodiment.

FIG. 2 illustrates an architecture of an MCD system 200 with a system memory 104 and a MCD table 202 according to one embodiment. The MCD system 200 includes a pointer 106 that includes an MCD unique ID 110 and a memory address 112 referencing a memory object 138. The memory object 138 can include of contiguous memory blocks 122A-122N. The MCD table 202 may include MCD unique IDs 120A-120N associated with the contiguous memory blocks 122A-122N. The MCD unique IDs 120A-120N can be stored at offsets derived from the base addresses of the corresponding contiguous memory blocks 122A-122N.

Figure 3:
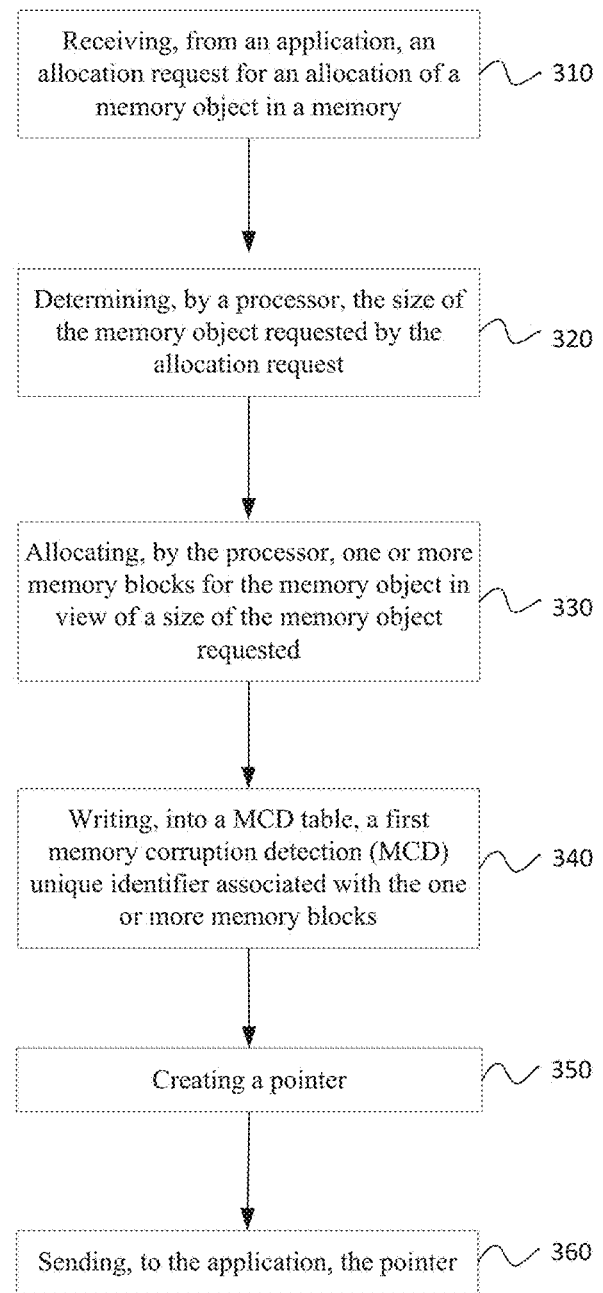
FIG. 3 depicts a flow diagram of a method for allocating memory according to one embodiment.

FIG. 3 depicts a flow diagram of a method for allocating memory according to one embodiment. Method 300 may be performed by a computer system that may comprise hardware (e.g., circuitry, dedicated logic, and/or programmable logic), software (e.g., instructions executable on a computer system to perform hardware simulation), or a combination thereof. Method 300 and/or each of its functions, routines, subroutines, or operations may be performed by one or more physical processors of the computer system executing the method. Two or more functions, routines, subroutines, or operations of method 300 may be performed in parallel or in an order which may differ from the order described above. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

Referring to FIG. 3, the method 300 may begin with a processor or software library (runtime) receiving, from an application, an allocation request for an allocation of a memory object in a memory (block 310). The memory object can be a contiguous portion of the memory that includes one or more contiguous memory blocks. In one example, the processor or library can receive the allocation request when the application begins or may be initiated (e.g., an initial allocation request of memory from the application). In another example, the processor or library can receive the allocation request while the application may be running (e.g., a subsequent allocation request of memory from the application).

The method can further include, determining, by the processor or library, a size of the memory object requested by the allocation request, such as an amount of bytes (N bytes) of memory (block 320). In one example, the memory can be broken down into fixed block sizes of memory (e.g., contiguous memory blocks). For exemplary purposes in the proceeding paragraphs, it can be assumed that the contiguous memory blocks can be 64 bytes (B). However, the contiguous memory block size of 64 B is not intended to be limiting and the contiguous memory block sizes can be any size set by an allocation library of the processor or a MCD system.

In one example, the allocation library can determine a size of memory being requested. For example the size may be: a first size, wherein the first size can be the memory object with a number of contiguous memory blocks below a first threshold amount; a second size, where the second size can be the memory object with a number of contiguous memory blocks that exceeds the first threshold amount and is below a second threshold amount; or a third size, where the third size can be the memory object with a number of contiguous memory blocks that exceeds the second threshold amount. In this example, the first threshold value can be 48 B and the second threshold can be 4 KB. The total size of the contiguous memory block associated with the first threshold value may be 64 B, where 48 B may be for user data and the remaining 16 B can be for the memory allocator metadata. In another example, the allocation library can determine when the request is an aligned request. In this example, the allocation request can include an alignment indicator indicating when the request includes an aligned request. The method can include allocating, by the processor, one or more contiguous memory blocks for the memory object in view of the size of the memory object requested (block 330).

In one example, the allocation request can also include a buffer alignment indicator. The buffer alignment indicator can indicate when to align a MCD unique identifier field to an end of the contiguous memory block (slack alignment), align the user buffer between a beginning of the contiguous memory block and the end of the contiguous memory block (reduced slack alignment), or align the end of the user buffer to the end of the contiguous memory block (e.g., an alignment which allows the detection of 1-byte overflows).

FIG. 4A illustrates a contiguous memory block 410 with a slack alignment according to one embodiment. The contiguous memory block 410 can include a memory allocator meta-data field 404 to store memory allocator meta-data, a user data field 406 to store user data, and an overhead or overflow field 408 to store overhead or overflow data. In one example, the contiguous memory block 410 may be 64 B in size and partitioned into four 16 B sub-blocks 414, 416, 418, and 420. In this example, the memory allocation meta-data field 404 can end within the initial sub-block 420 and the beginning of the memory allocation meta-data field 404 can be aligned with a start of one of the sub-block 414. The user data field 406 can end within the second sub-block 418 or the last sub-block 420 and the beginning of the user data field 406 can be aligned with a start of one of the sub-blocks 414, 416, 418 or 420 (in this example the user data field is aligned with the start of sub-block 416). The overhead or overflow field 408 can be aligned to the end of the last sub-block 420.

The slack alignment can provide the application with a small overflow memory allocation when a memory write from an application overflows an allocated contiguous memory block space. The overflowing field 408 of the slack alignment can provide additional space for user data 406, but storing user data in the overflow field 408 can introduce overrun errors that may go undetected (e.g., silent errors). In one example, the memory allocation meta-data field 404 and the user data field 406 can be separate fields. In another example, the memory allocation meta-data field 404 and the user data field 406 can be combined to one field.

When an application overflows the contiguous memory block 410 and begins storing user data in another contiguous memory block, the MCD system can catch the memory corruption or memory error as a MCD unique ID in a MCD unique ID field stored in a memory corruption detection table, corresponding to the other contiguous memory block may be different than a MCD unique ID of a pointer from the application. When the application underflows the user data field 406 when writing user data to the contiguous memory block 410 (e.g., writes user data in the memory allocator meta-data field 404), the application can corrupt the memory allocator meta-data field 404 and may receive a fault message from the memory allocator system. When the application underflows the user data field 406 by reading the memory allocator meta-data 404 instead of user data from the contiguous memory block 410 (e.g., attempting to read data in the memory allocator meta-data field 404), the application may read meaningless data (e.g., not user data) can generate an error message. When the application underflows the user data field 406 by reading overflow data or user data from a previous contiguous memory block, the MCD system can catch a memory corruption in the data based on a MCD unique ID of the previous contiguous memory block not matching a MCD unique ID of a pointer of the application.

FIG. 4B illustrates a contiguous memory block 412 with a reduced slack alignment according to one embodiment. The contiguous memory block 412 can include a dead field 402 (e.g., an empty data field), a memory allocator meta-data field 404 to store memory allocator meta-data, a user data field 406 to store user data, and an overhead or overflow field 408 to store overhead or overflow data. In one example, the contiguous memory block 412 may be 64 B in size and partitioned into four 16 B sub-blocks 414, 416, 418, and 420. In this example, the user data field 406 can end within the last sub-block 420 and the beginning of the user data field 406 can be aligned with a start of one of the sub-blocks 414, 416, 418 or 420 (in this example the user data field is aligned with the start of sub-block 418). The memory allocator meta-data field 404 can be aligned to a sub-block preceding the user data field 406, such as at sub-block 414 or 416 (in this example sub-block 416). The MCD system can determine a location of the memory allocator meta-data by subtracting a multiple of 16 B from the pointer (p) from the application that points to the beginning of the user data field 406, e.g., the MCD unique ID field can be located at p−16*N. In one example, the memory allocation meta-data field 404 and the user data field 406 can be separate fields. In another example, the memory allocation meta-data field 404 and the user data field 406 can be combined to one field.

The contiguous memory block 412 with the reduced slack alignment can provide applications with additional underflow user data space at the dead field 402 and/or overflow user data space at the overflow field 408. Preserving the overflowing field 408 and the dead field 402 of the reduced slack alignment can provide additional space for user data, but storing user data in the overflow field 408 and/or the dead field 402 can introduce silent errors. When the application overflows beyond the overflow field 408 and writes user data to another contiguous memory block, the MCD system can catch the memory corruption, as discussed in the preceding paragraphs for slack alignment. When the application underflows into a data field of another contiguous memory block, the MCD system can catch the memory corruption, as discussed in the preceding paragraph for slack alignment. When the application underflows and writes data into the dead field 402, the underflow data writes can introduce silent errors. When the application overwrites the memory allocator meta-data field 404, the application may receive a fault message. The allocation library can align data fields (dead field 402, memory allocator meta-data field 404, user data field 406, and/or overflow field 408) of the contiguous memory block 412 using a selected or predefined slack alignment to improve vector performance. In one example, the data fields can be aligned using streaming single instruction multiple data (SIMD) extensions (SSE) for 16 B alignment or advanced vector extensions (AVX) or AVX2 for 32 B alignment.

FIG. 4C illustrates a contiguous memory block 422 with a 1-byte overflow detection alignment according to one embodiment. The contiguous memory block 422 can include a memory allocator meta-data field 404 to store memory allocator meta-data, a user data field 406 to store user data, and an overhead or overflow field 408 to store overhead or overflow data. In one example, the contiguous memory block 422 may be 64 B in size and partitioned into four 16 B sub-blocks 414, 416, 418, and 420. In one example, the memory allocator meta-data field 404 can be aligned using a logical AND operation between an address location of the pointer (e.g., the beginning of the user data field 406) and ~0x3F (e.g., allocator_meta_data=p & ~0x3F). In another example, the MCD unique ID field 404 can be aligned with the beginning or end of the first sub-block 414. In one example, the memory allocation meta-data field 404 and the overflow field 408 can be separate fields. In another example, the memory allocation meta-data field 404 and the overflow field 408 can be combined to one field.

In one example, the user data field 406 can be aligned with an end of the last sub-block 420 (e.g., the last byte of sub-block 420) and the beginning of the user data field can be aligned within one of the sub-blocks 414, 416, or 418 (in this example the user data field is aligned within the sub-block 418). When the application writes user data to the contiguous memory block 422 and overflows the contiguous memory block 422, such as by a single byte, the user data may be written to another contiguous memory block and MCD system can catch the memory corruption, as discussed in the preceding paragraphs for slack alignment. When the application writes data to the overflow field 408 (e.g., underflows), then a memory corruption error may go undetected. When the application overflows the memory allocator meta-data field 406, (e.g., writes data in another contiguous memory block), the application may receive a fault or memory corruption error message. When the application underflows a contiguous memory block, the application may write to a previous contiguous memory block in system memory and the MCD may catch the memory corruption, as discussed in the preceding paragraphs for slack alignment. Memory block overflows may be more common than contiguous memory block underflows. One advantage of a 1-byte overflow alignment can be to reduce memory corruption and increase error detection because the address checking performed by the MCD system can detect the single byte overflow where the user data field 406 is aligned with the last byte of the sub-block 420.

Returning to FIG. 3, in one example, the allocation request may be for a medium request to allocate a portion of the system memory (e.g., available heap) for a contiguous memory block. In one example, the medium request may be a request for a memory object size that exceeds the first threshold (such as 48 B) and is below the second threshold (such as 4 KB). The memory object for a second size request can include multiple contiguous memory blocks. The contiguous memory blocks can be aligned using the slack alignment, reduces slack alignment, and/or the 1-byte overflow alignment as discussed for the small request in the preceding paragraphs. In another example, the allocation requests may be for a large request to allocate a portion of the system memory (e.g., available heap) for a contiguous memory block. In one example, the large request may be a request for a memory object size that exceeds the second threshold (such as 4 KB). The memory object for a third size request can include multiple contiguous memory blocks. The contiguous memory blocks can be aligned using the slack alignment, reduces slack alignment, and/or the 1-byte overflow alignment, as discussed for the small request in the preceding paragraphs. In one example, when the allocation request may be for the large request, the allocation library may use a mmap system call (such as in Linux® based systems) that directly maps multiple pages of memory. When a mmap system call may be used, the alignments discussed in the preceding paragraphs may be used for the contiguous memory blocks of the multiples pages.

In one example, the allocation request may be for an aligned request, such that the first byte in the user-buffer is aligned to a requested alignment. In this example, the application may select a first byte of the contiguous memory block to align the user data field. When the requested memory object size may not be a multiple of the fixed contiguous memory block size (e.g., a multiple of 8 B, 16 B, 32 B, 64 B, and so forth), then overflow can go undetected by the MCD system. In another example, the MCD system or the processor can be operable to a predefined contiguous memory block size, such as a contiguous memory block size of 64 B when using the various alignments discussed in the preceding paragraphs. In this example, when an allocation request from the application may be for a contiguous memory block size below 64 B (such as 2 B, 4 B, 8 B, 16 B or 32 B), the MCD system may increase the allocation request to a 64 B contiguous memory block size request.

The method can also include writing, into a MCD table, a first memory corruption detection (MCD) unique identifier associated with the one or more contiguous memory blocks (step 340). To write the MCD unique IDs (such as a MCD color value) into the MCD table, the allocation library can generate a MCD unique ID using a selection scheme. In one example, the allocation library can use a round robin selection scheme to generate the MCD unique IDs. In another example, the allocation library can use a pseudo-randomized selection scheme to generate the MCD unique IDs. The pseudo-randomized scheme can be a scheme to generate randomized MCD unique IDs for contiguous memory blocks. When a MCD unique ID of a neighboring contiguous memory block may be the same identifier, the allocation library can choose another identifier for the current contiguous memory block. When the allocation library has selected a color for the current contiguous memory block, the allocation library can associate the MCD unique ID in the MCD table with the bytes of the contiguous memory block. In one example, the allocation library can associate the MCD unique ID with the entire memory object. In another example, the allocation library can associate the MCD unique ID with a portion of the memory object that stores the user data. In another example, the allocation library can allocate one or more MCD unique ID for different types of contiguous memory blocks. For example, the allocation library can allocate a first MCD unique ID for freed or empty memory objects and a second MCD unique ID for high priority or special memory object.

When the allocation library has selected a MCD unique ID for a memory object, the MCD unique ID can be associated in the MCD table with the bytes of the memory object. For example, when the size of the memory object may be 100 bytes and the contiguous memory block of the memory objects may be 64 B, then the memory object may span 2 contiguous memory blocks (each 64 B). In this example, the allocation library can associate each of the 2 contiguous memory blocks with the same MCD unique ID in the MCD table. The MCD architecture may support a multi-level MCD table, such as a two-level MCD table. In one example, the allocation library can use the following code to fill the MCD table with the associated MCD unique IDs:

```
for (curr_addr=addr; curr_addr<addr+len; curr_addr+=64) {
    l1_offs = calculate_first_level_offset (curr_addr);
    l2_table = l1_table [l1_offs];                                      (1)
    l2_offs = calculate_second_level_offset (curr_addr);
    l2_table [l2_offs] = MCD_byte;}
``` where len is a length of the contiguous memory block and addr is a location of a virtual address of the system memory. The code (1) can be optimized with vector operations.

The method can also include creating a pointer (block 350). In one example, the pointer can include a memory address indicating a location of the memory object in the memory. In another example, the pointer can include a second MCD unique identifier associated with the memory object. The method can also include sending, to the application, the pointer (block 360).

Figure 5:
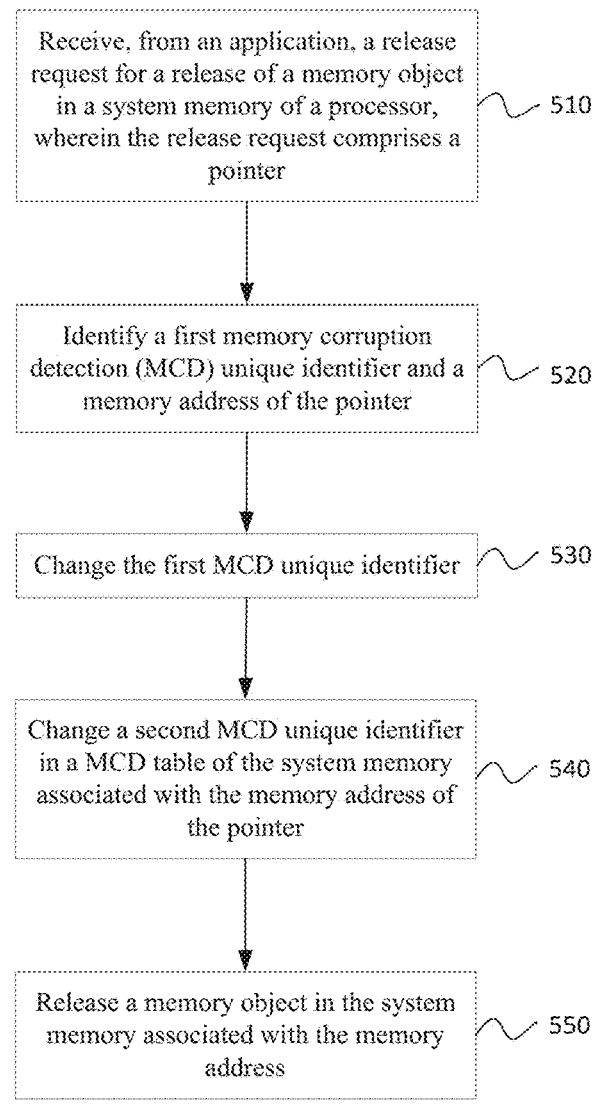
FIG. 5 illustrates a flow diagram of a method of freeing allocated memory by unsetting or changing the MCD unique identifier in the MCD table when the application is no longer executing according to one embodiment.

FIG. 5 illustrates a flow diagram of a method 500 of freeing allocated memory by unsetting or changing the MCD unique ID in the MCD table when the application is no longer executing according to one embodiment. Method 500 may be performed by a computer system that may comprise hardware (e.g., circuitry, dedicated logic, and/or programmable logic), software (e.g., instructions executable on a computer system to perform hardware simulation), or a combination thereof. Method 500 and/or each of its functions, routines, subroutines, or operations may be performed by one or more physical processors of the computer system executing the method. Two or more functions, routines, subroutines, or operations of method 500 may be performed in parallel or in an order which may differ from the order described above. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

Referring to FIG. 5, the method 500 can begin with receiving, from an application, a release request for a release of a memory object in a system memory of a processor, wherein the release request can include a pointer (block 510). The method can include identifying, by a processor, a first memory corruption detection (MCD) unique ID and a memory address of the pointer (block 520). The method can further include changing, by the processor, the first MCD unique ID (block 530).

In one example, the allocation library can use the following code to identify and change the first MCD unique ID:

```
for (curr_addr=addr; curr_addr<addr+len; curr_addr+=64) {
    l1_offs = calculate_first_level_offset (curr_addr);
    l2_table = l1_table [l1_offs];                              (2)
    l2_offs = calculate_second_level_offset (curr_addr);
    assert (Pointer_MCD_color == l2_table [l2_offs]);
    l2_table [l2_offs] = 0;}
```

The method can further include changing, by the processor, a second MCD unique ID in a MCD table of the system memory associated with the memory address of the pointer (block 540). In one example, the allocation library can release or unset the MCD unique ID by switching the MCD color value to another predefined MCD unique ID. In another example, the allocation library can change or unset the MCD unique ID by switching the MCD unique ID to a non-MCD unique ID (such as zero). In another example, the allocation library can change or unset the MCD unique ID by switching the MCD unique ID to a random MCD unique ID or a next MCD unique ID of a round-robin scheme. The method can include, checking, by the allocation library, for MCD unique ID consistency, e.g., verify that the MCD unique ID that the contiguous memory block is changed to is different than MCD unique IDS of memory objects adjacent to the memory object being freed. The method can further include releasing, by the processor, a memory object in the system memory associated with the memory address (block 550).

Figure 6:
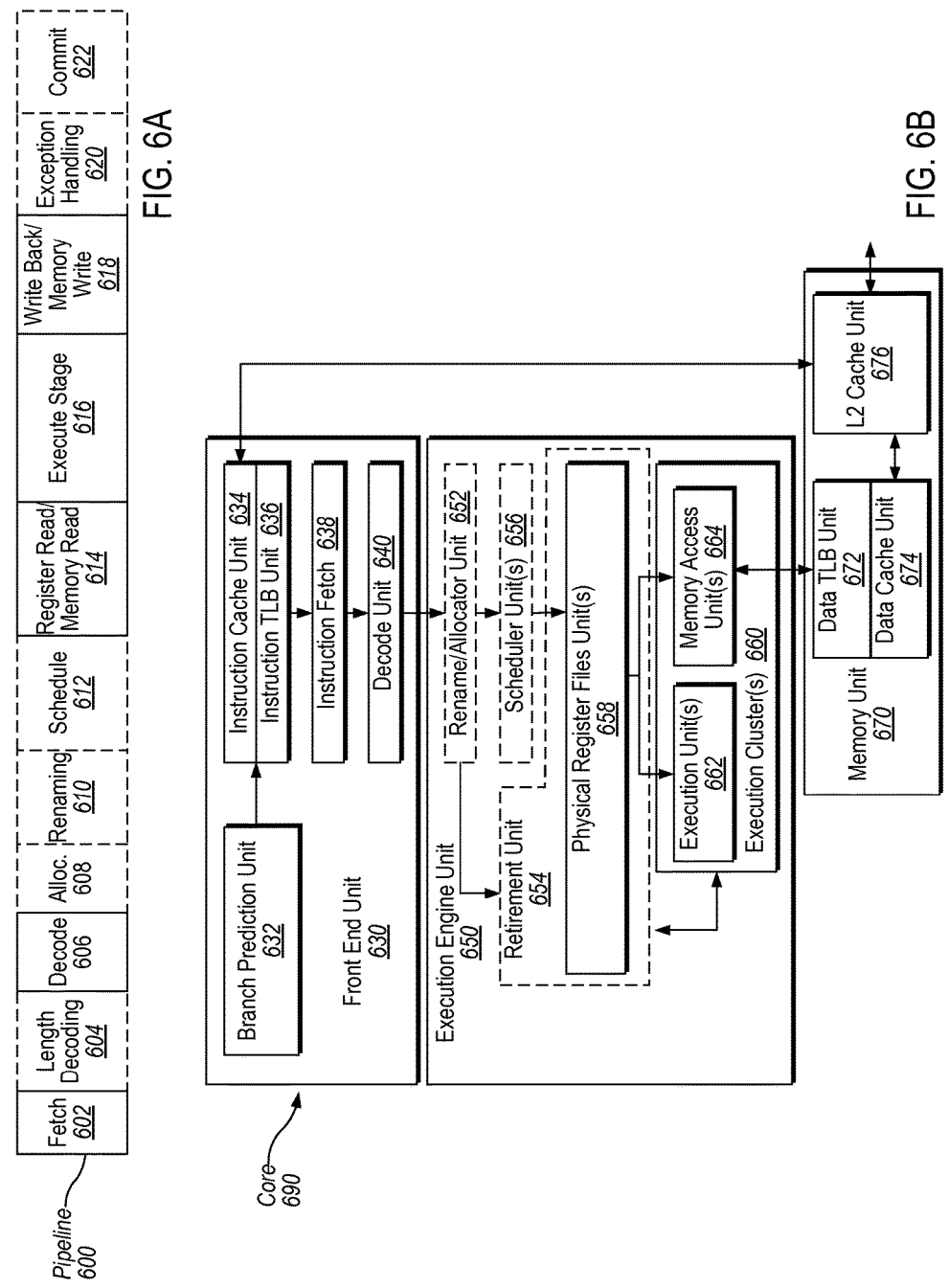
FIG. 6A is a block diagram illustrating an in-order pipeline and a register renaming stage, out-of-order issue/execution pipeline according to one embodiment.
FIG. 6B is a block diagram illustrating a micro-architecture for a processor that implements secure memory repartitioning according to one embodiment.

FIG. 6A is a block diagram illustrating a micro-architecture for a processor 600 that implements secure memory repartitioning according to one embodiment. Specifically, processor 600 depicts an in-order architecture core and a register renaming logic, out-of-order issue/execution logic to be included in a processor according to at least one embodiment of the disclosure. The embodiments of the page additions and content copying can be implemented in processor 600.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 660. The decode unit 660 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 660 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 660 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different schedulers, including reservations stations (RS), central instruction window, etc. The scheduler unit(s) 656 is coupled to the physical register file(s) unit(s) 658. Each of the physical register file(s) units 658 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 658 is overlapped by the retirement unit 654 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register file(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register file(s) unit(s) 658, and execution cluster(s) 660 are shown as being possibly plural because certain embodiments create separate pipelines for certain types of data/operations (e.g., a scalar integer pipeline, a scalar floating point/packed integer/ packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline, while the dashed lined boxes illustrates a register renaming, out-of-order issue/execution pipeline. In FIG. 6B, a processor pipeline 600 includes a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
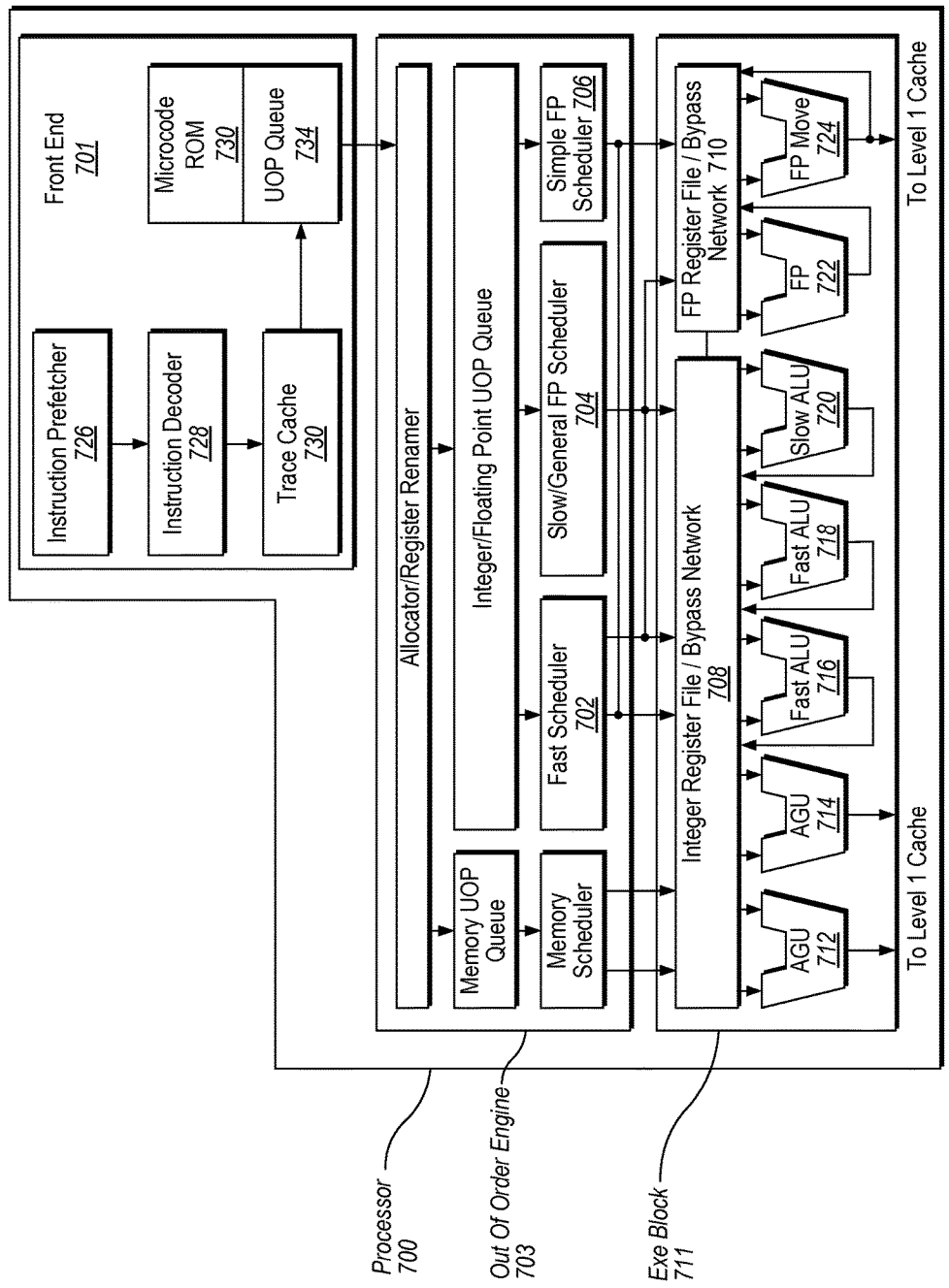
FIG. 7 illustrates a block diagram of the micro-architecture for a processor that includes logic circuits to perform secure memory repartitioning according to one embodiment.

FIG. 7 illustrates a block diagram of the micro-architecture for a processor 700 that includes logic circuits to perform secure memory repartitioning according to one embodiment. In some embodiments, an instruction in accordance with one embodiment can be implemented to operate on data elements having sizes of byte, word, doubleword, quadword, etc., as well as data types, such as single and double precision integer and floating point data types. In one embodiment the in-order front end 701 is the part of the processor 700 that fetches instructions to be executed and prepares them to be used later in the processor pipeline. The embodiments of the page additions and content copying can be implemented in processor 700.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, the microcode ROM 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register files 708, 710, sit between the schedulers 702, 704, 706, and the execution units 712, 714, 716, 718, 710, 712, 714 in the execution block 711. There is a separate register file 708, 710, for integer and floating point operations, respectively. Each register file 708, 710, of one embodiment also includes a bypass network that can bypass or forward just completed results that have not yet been written into the register file to new dependent uops. The integer register file 708 and the floating point register file 710 are also capable of communicating data with the other. For one embodiment, the integer register file 708 is split into two separate register files, one register file for the low order 32 bits of data and a second register file for the high order 32 bits of data. The floating point register file 710 of one embodiment has 128 bit wide entries because floating point instructions typically have operands from 64 to 128 bits in width.

The execution block 711 contains the execution units 712, 714, 716, 718, 710, 712, 714, where the instructions are actually executed. This section includes the register files 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 710, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 710 as the slow ALU 710 includes integer execution hardware for long latency type of operations, such as a multiplier, shifts, flag logic, and branch processing. Memory load/store operations are executed by the AGUs 712, 714. For one embodiment, the integer ALUs 716, 718, 710, are described in the context of performing integer operations on 64 bit data operands. In alternative embodiments, the ALUs 716, 718, 710, can be implemented to support a variety of data bits including 16, 32, 128, 256, etc. Similarly, the floating point units 712, 714, can be implemented to support a range of operands having bits of various widths. For one embodiment, the floating point units 712, 714, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 700 also includes logic to implement secure memory repartitioning according to one embodiment. In one embodiment, the execution block 711 of processor 700 may include MCU 115, to perform secure memory repartitioning according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 8:
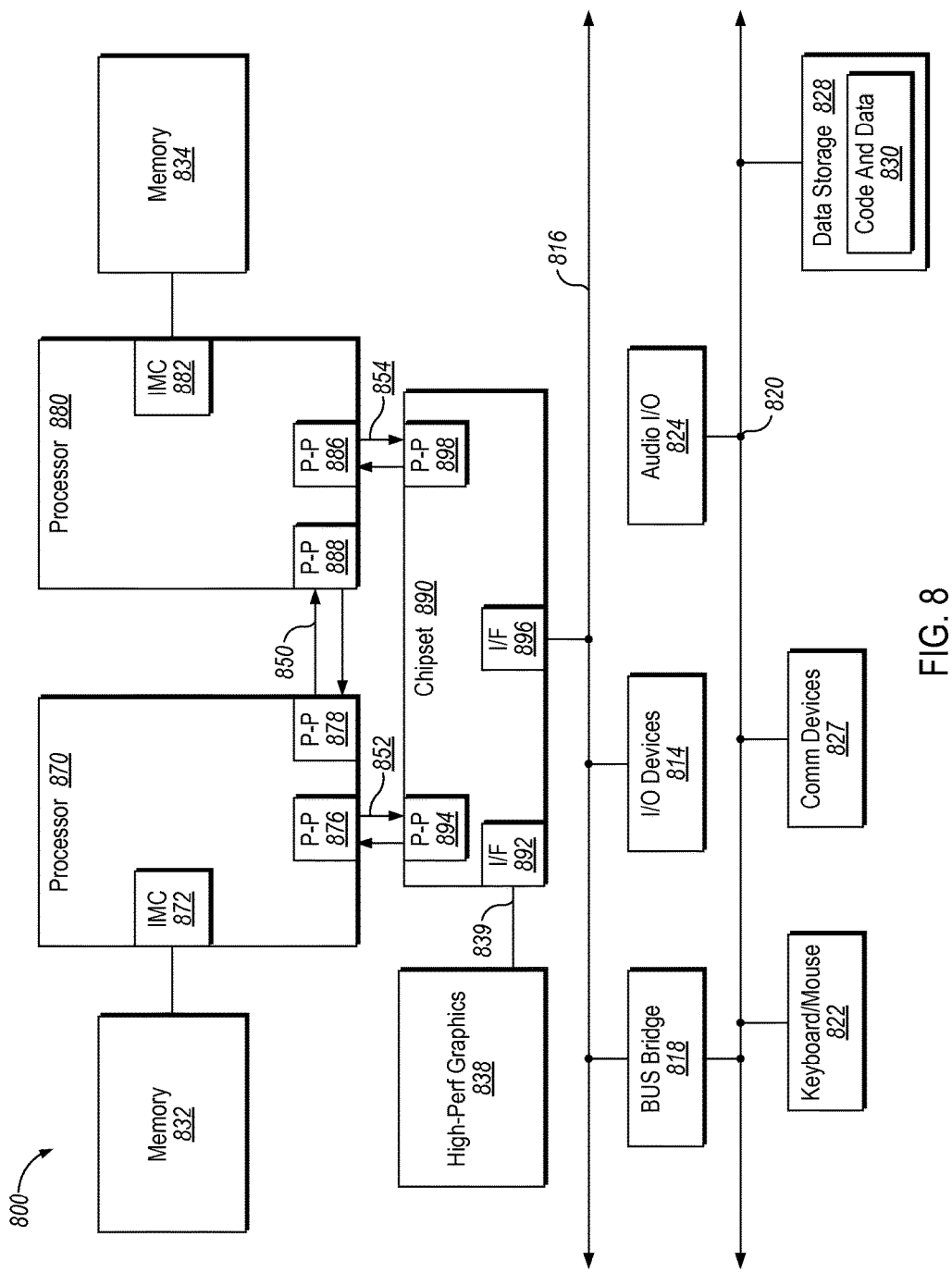
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874a and 874b and processor cores 884a and 884b), although potentially many more cores may be present in the processors. The processors each may include hybrid write mode logics in accordance with an embodiment of the present. The embodiments of the page additions and content copying can be implemented in the processor 870, processor 880, or both.

While shown with two processors 870, 880, it is to be understood that the scope of the present disclosure is not so limited. In other implementations, one or more additional processors may be present in a given processor.

Processors 870 and 880 are shown including integrated memory controller units 882 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 888, 888. As shown in FIG. 8, IMCs 882 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another third generation 10 interconnect bus, although the scope of the present disclosure is not so limited.

As shown in FIG. 8, various IO devices 814 may be coupled to first bus 816, along with a bus bridge 818 which couples first bus 816 to a second bus 820. In one embodiment, second bus 820 may be a low pin count (LPC) bus. Various devices may be coupled to second bus 820 including, for example, a keyboard and/or mouse 822, communication devices 827 and a storage unit 828 such as a disk drive or other mass storage device which may include instructions/code and data 830, in one embodiment. Further, an audio IO 824 may be coupled to second bus 820. Note that other architectures are possible. For example, instead of the point-to-point architecture of FIG. 8, a system may implement a multi-drop bus or other such architecture.

Figure 9:
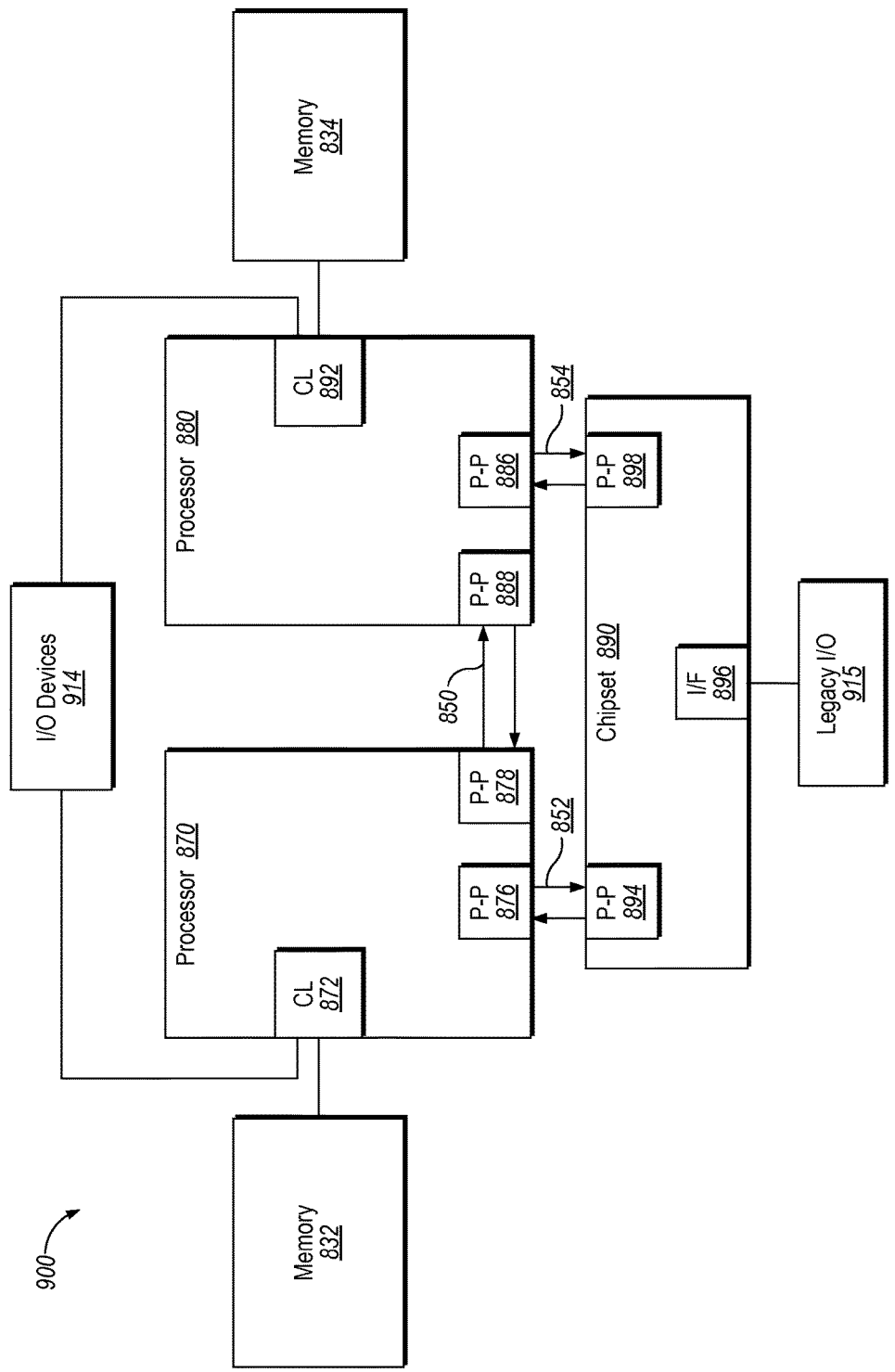
FIG. 9 is a block diagram of a computer system according to another implementation.

Referring now to FIG. 9, shown is a block diagram of a third system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 970, 980 may include integrated memory and IO control logic ("CL") 972 and 982, respectively. For at least one embodiment, the CL 972, 982 may include integrated memory controller units such as described herein. In addition. CL 972, 982 may also include IO control logic. FIG. 9 illustrates that the memories 932, 934 are coupled to the CL 972, 982, and that IO devices 914 are also coupled to the control logic 972, 982. Legacy IO devices 915 are coupled to the chipset 990. The embodiments of the page additions and content copying can be implemented in processor 970, processor 980, or both.

Figure 10:
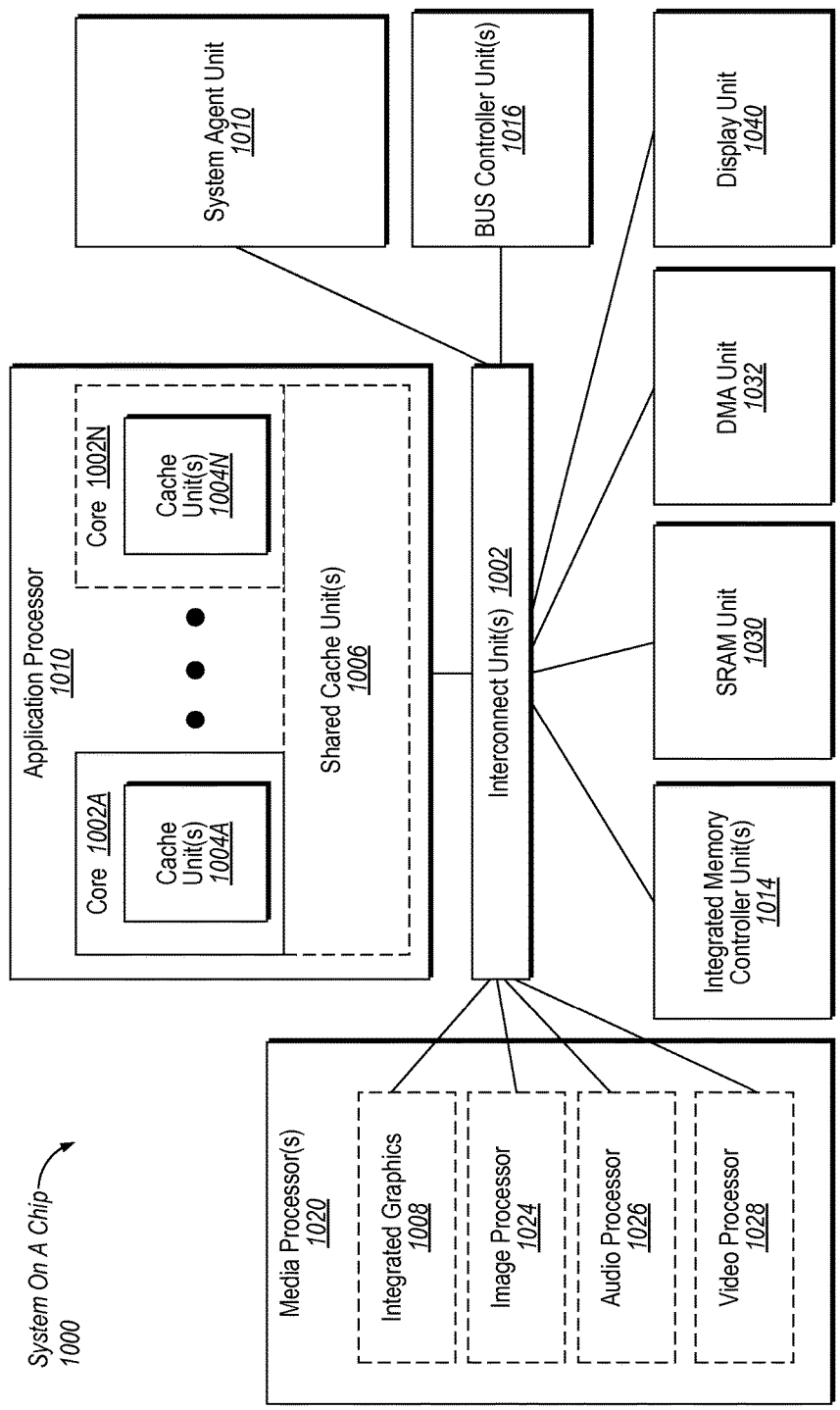
FIG. 10 is a block diagram of a system-on-a-chip according to one implementation.

FIG. 10 is an exemplary system on a chip (SoC) that may include one or more of the cores 1002. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 10, shown is a block diagram of a SoC 1000 in accordance with an embodiment of the present disclosure. Also, dashed lined boxes are features on more advanced SoCs. In FIG. 10, an interconnect unit(s) 1002 is coupled to: an application processor 1010 which includes a set of one or more cores 1002A-N and shared cache unit(s) 1006; a system agent unit 1010; a bus controller unit(s) 1016; an integrated memory controller unit(s) 1014; a set or one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays. The embodiments of the pages additions and content copying can be implemented in SoC 1000.

Figure 11:
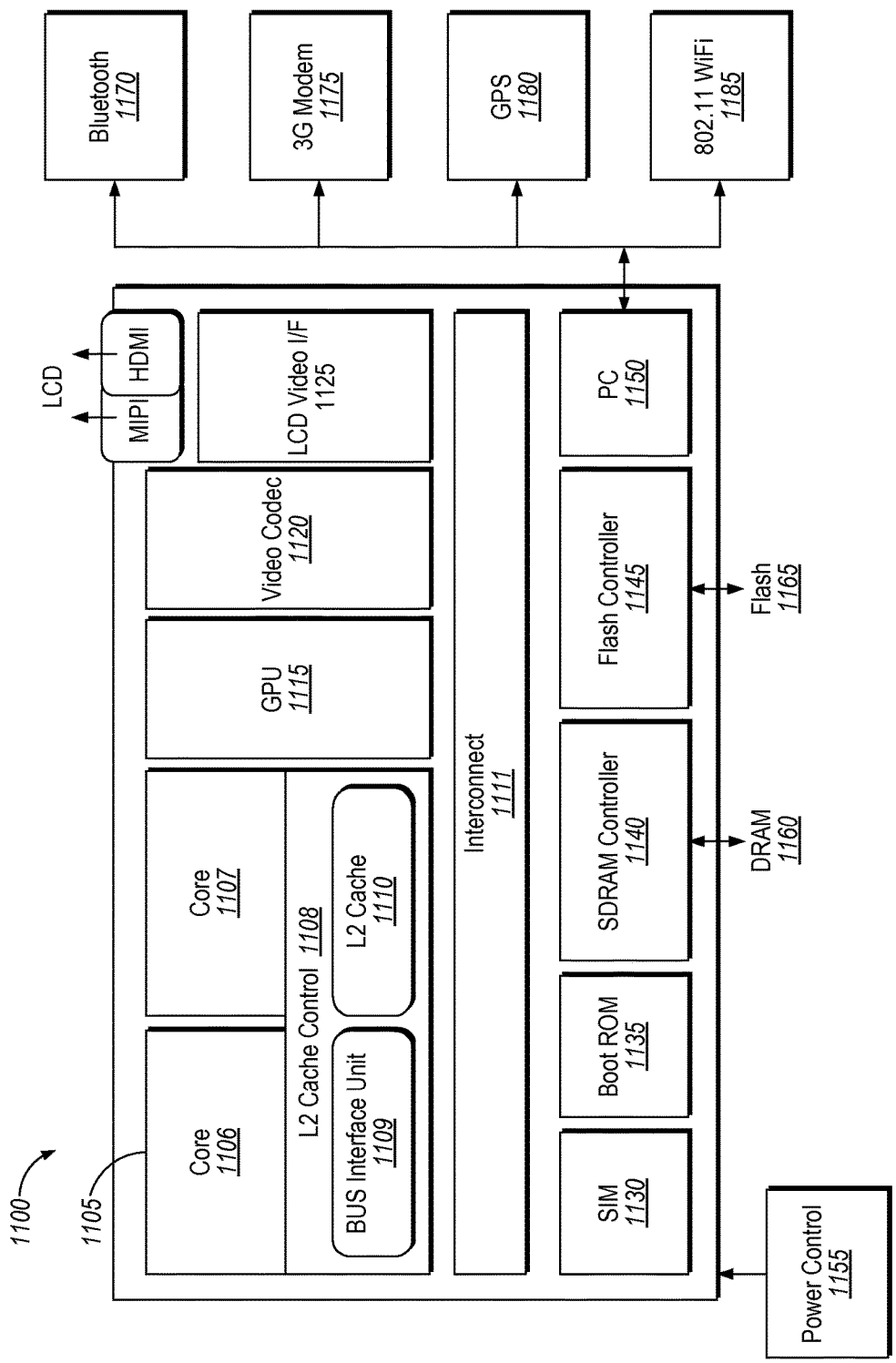
FIG. 11 illustrates another implementation of a block diagram for a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth module 1170, 3G modem 1175, GPS 1180, and Wi-Fi 1185. Note as stated above, a UE includes a radio for communication. As a result, these peripheral communication modules may not all be included. However, in a UE some form of a radio for external communication should be included.

Figure 12:
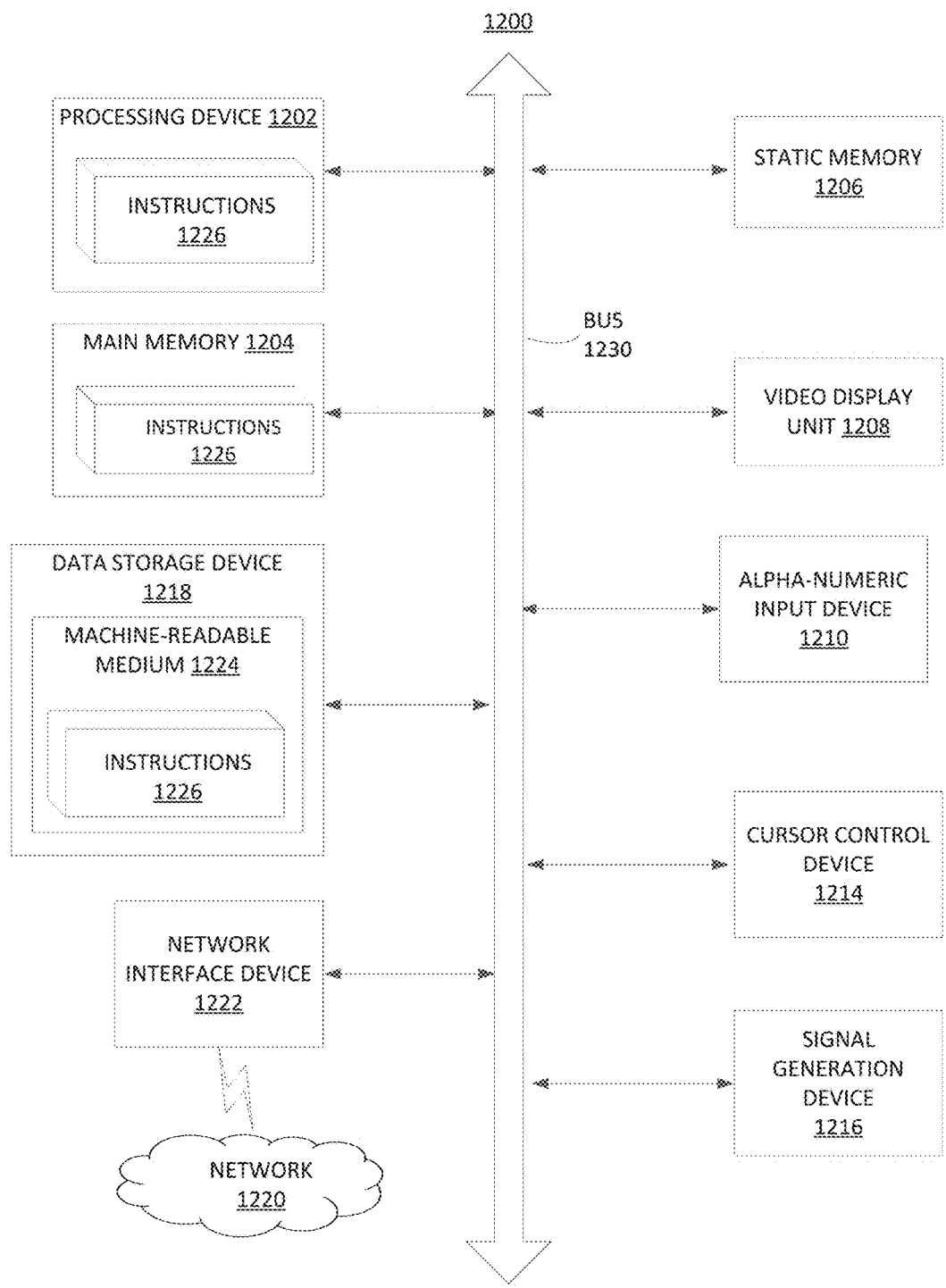
FIG. 12 illustrates another implementation of a block diagram for a computing system.

FIG. 12 illustrates a diagrammatic representation of a machine in the exemplary form of a computer system 1200 within which a set of instructions for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1200 includes a processing device (processor) 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230.

Processor 1202 represents one or more general-purpose processing devices such as a microprocessor, central processing unit, or the like. More particularly, the processor 1202 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1202 may also be one or more special-purpose processing devices such as an application specific integrated circuit (ASIC), a field programmable gate array (FPGA), a digital signal processor (DSP), network processor, or the like. The processor 1202 is configured to execute instructions 1226 for performing the operations and steps discussed herein.

The computer system 1200 may further include a network interface device 1222. The computer system 1200 also may include a video display unit 1208 (e.g., a liquid crystal display (LCD), a cathode ray tube (CRT), or a touch screen), an alphanumeric input device 1210 (e.g., a keyboard), a cursor control device 1214 (e.g., a mouse), and a signal generation device 1216 (e.g., a speaker).

The data storage device 1218 may include a computer-readable storage medium 1224 on which is stored one or more sets of instructions 1226 (e.g., software) embodying any one or more of the methodologies or functions described herein. The instructions 1226 may also reside, completely or at least partially, within the main memory 1204 and/or within the processor 1202 during execution thereof by the computer system 1200, the main memory 1204 and the processor 1202 also constituting computer-readable storage media. The instructions 1226 may further be transmitted or received over a network 1220 via the network interface device 1234.

While the computer-readable storage medium 1224 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media. The following examples pertain to further embodiments.

In Example 1, is a processor, including: 1) a memory to store data from an application, wherein the memory comprises a memory corruption detection (MCD) table; and 2) a processor core coupled to the memory, wherein the processing core is operable to: a) receive, from the application, an allocation request for an allocation of one or more contiguous memory blocks of the memory for a memory object; b) allocate the one or more contiguous memory blocks for the memory object in view of a size of the memory object requested; c) write, into the MCD table, a first MCD unique identifier associated with the one or more memory blocks; d) create a pointer with a memory address of the memory object and a second MCD unique identifier associated with the memory object; and e) send, to the application, the pointer.

In Example 2, the processor of Example 1 where the processor core is further to determine the size of the memory object requested by the allocation request.

In Example 3, the processor of Examples 1-2 where the processor core is further to: 1) compare the first MCD unique identifier with the second MCD unique identifier; and 2) communicate a corruption detection message to the application when the first MCD unique identifier and the second MCD unique identifier do not match.

In Example 4, the processor of Examples 1-3 where the size of the memory object requested is: 1) a first size, wherein the first size is a request for the memory object with a number of contiguous memory blocks below a first threshold amount; 2) a second size, wherein the second size is a request for the memory object with a number of contiguous memory blocks that exceeds the first threshold amount and is below a second threshold amount; and 3) a third size, wherein the third size is a request for the memory object with a number of contiguous memory blocks that exceeds the second threshold amount.

In Example 5, the processor of Examples 1-4 where the processor core is further to: 1) divide the one or more contiguous memory blocks into a plurality of sub-blocks, wherein the plurality of sub-blocks comprise: a) an initial sub-block; b) one or more middle sub-blocks; and c) a last sub-block; and 2) store data, to be aligned with to each of the plurality of sub-blocks, of at least one of a memory allocation meta-data field, a user data field, an overhead data filed, or an empty data field.

In Example 6, the processor of Examples 1-5 where the processor core is further to: 1) store data of the memory allocation meta-data field within initial sub-block so that the memory allocation meta-data field is aligned with a starting boundary of the initial block; 2) store data of the user data field within a first middle sub-block of the one or more middle sub-blocks so that the user data field is aligned with a starting boundary of the first middle sub-block; and 3) store data of the overhead data field with the last sub-block of the last sub-block so that the overhead data field is aligned with an ending boundary of the last sub-block.

In Example 7, the processor of Examples 1-6 the processor core is further to: 1) store data of the empty data field within initial sub-block so that the empty data field is aligned with a starting boundary of the initial block; 2) store data of the memory allocation meta-data field within a first middle sub-block of the one or more middle sub-blocks so that the memory allocation meta-data field is aligned with a starting boundary of the first middle sub-block; 3) store data of the user data field within a second middle sub-block of the one or more middle sub-blocks so that the user data field is aligned with a starting boundary of the second middle sub-block; and 4) store data of the overhead data field with the last sub-block of the last sub-block so that the overhead data field is aligned with an ending boundary of the last sub-block.

In Example 8, the processor of Examples 1-7 the processor core is further to: 1) store data of the memory allocation meta-data field within initial sub-block so that the memory allocation meta-data field is aligned with a starting boundary of the initial block; 2) store data of the overhead data field within a first middle sub-block of the one or more middle sub-blocks so that the overhead data field is aligned with a starting boundary of the first middle sub-block; and 3) store data of the user data field with the last sub-block of the last sub-block so that the user data field is aligned with an ending boundary of the last sub-block.

In Example 9, the processor of Examples 1-8 where the processor core is further to store data of the memory allocation meta-data field, data of the user data field, data of the overhead data field, or data of the empty data field based on a predetermined sub-block alignment of the processor.

In Example 10, the processor of Examples 1-9 where the processor core is further to determine the MCD unique identifier associated with the memory object using a round-robin selection scheme.

In Example 11, the processor of Examples 1-10 where the processor core can further: 1) determine the MCD unique identifier associated with the memory object using a random selection scheme; and 2) verify that the MCD unique identifier is different from another MCD unique identifier of an adjacent contiguous memory block.

Various embodiments may have different combinations of the structural features described above. For instance, all optional features of the processors and methods described above may also be implemented with respect to a system described herein and specifics in the examples may be used anywhere in one or more embodiments.

In Example 12, is a system on a chip (SoC) including: 1) a processor; 2) a memory device coupled to the processor; 3) a memory controller coupled to the memory device, the memory controller to: a) receive, from an application, an release request for a release of a memory object in a system memory of a processor, wherein the release request comprises a pointer; b) identify a first memory corruption detection (MCD) unique identifier and a memory address of the pointer; c) change the first MCD unique identifier; d) change a second MCD unique identifier in a MCD table of the system memory associated with the memory address of the pointer; and e) release a memory object in the system memory associated with the memory address.

In Example 13, is the SoC of any of Example 12, where the memory controller is further to change, by the processor device, the second MCD unique identifier using a round-robin selection scheme.

In Example 14, is the SoC of any of Example 12-13, where the memory controller is further to change, by the processor device, the second MCD unique identifier using a random selection scheme.

In Example 15, is the SoC of any of Example 12-14, where the memory controller is further to verifying, by the processor device, that the second MCD unique identifier is different from another MCD unique identifier of an adjacent contiguous memory block.

Various embodiments may have different combinations of the structural features described above. For instance, all optional features of the processors and methods described above may also be implemented with respect to a system described herein and specifics in the examples may be used anywhere in one or more embodiments.

In Example 16, is a method including: 1) receiving, from the application, an allocation request for an allocation of one or more contiguous memory blocks of the memory for a memory object; 2) allocating, by a processor, the one or more contiguous memory blocks for the memory object in view of a size of the memory object requested; and 3) writing, into a MCD table, a first memory corruption detection (MCD) unique identifier associated with the one or more contiguous memory blocks; 4) creating a pointer with a memory address of the memory object and a second MCD unique identifier associated with the memory object; and 5) sending, to the application, the pointer.

In Example 17, is the method of Example 16 further including determining the size of the memory object requested by the allocation request.

In Example 18, is the method of Examples 16-17 further including: 1) comparing the first MCD unique identifier with the second MCD unique identifier; and 2) communicating a corruption detection message to the application when the first MCD unique identifier the second MCD unique identifier do not match.

In Example 19, is the method of Examples 16-18 where the size of the memory object requested is: 1) a first size, wherein the first size is the memory object with a number of contiguous memory blocks below a first threshold amount; 2) a second size, wherein the second size is the memory object with a number of contiguous memory blocks that exceeds the first threshold amount and is below a second threshold amount; and 3) a third size, wherein the third size is the memory object with a number of contiguous memory blocks that exceeds the second threshold amount.

In Example 20, is the method of Examples 16-19 further including: 1) dividing the one or more contiguous memory blocks into a plurality of sub-blocks, wherein the plurality of sub-blocks include: a) an initial sub-block; b) one or more middle sub-blocks; and c) a last sub-block; and 2) storing data, to be aligned with to each of the plurality of sub-blocks, of at least one of a memory allocation meta-data field, a user data field, an overhead data filed, or an empty data field.

Various embodiments may have different combinations of the structural features described above. For instance, all optional features of the processors and methods described above may also be implemented with respect to a system described herein and specifics in the examples may be used anywhere in one or more embodiments.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to secure memory repartitioning in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
   a memory to store data from an application, wherein the memory comprises a memory corruption detection (MCD) table; and
   a processor core coupled to the memory, wherein the processing core is operable to:
   receive, from the application, an allocation request for an allocation of one or more contiguous memory blocks of the memory for a memory object;
   allocate the one or more contiguous memory blocks for the memory object in view of a size of the memory object requested;
   write, into the MCD table, a first MCD unique identifier associated with the one or more contiguous memory blocks;
   create a pointer with a memory address of the memory object and a second MCD unique identifier associated with the memory object; and
   send, to the application, the pointer, wherein the allocation request is for an allocation having at least one of a first size or a second size, wherein the first size corresponds to a number of contiguous memory blocks below a first threshold amount, and wherein the second size corresponds to a number of contiguous memory blocks that exceeds the first threshold amount.

2. The processor of claim 1, wherein the processor core is further to determine the size of the memory object requested by the allocation request.

3. The processor of claim 1, wherein the processor core is further to:
   compare the first MCD unique identifier with the second MCD unique identifier; and communicate a corruption detection message to the application when the first MCD unique identifier and the second MCD unique identifier do not match.

4. The processor of claim 1, wherein the size of the memory object requested is at least one of the first size, the second size, or a third size, wherein the second size corresponds to a number of contiguous memory blocks that exceeds the first threshold amount and is below a second threshold amount, and wherein the third size corresponds to a number of contiguous memory blocks that exceeds the second threshold amount.

5. The processor of claim 1, wherein the processor is further to determine the MCD unique identifier associated with the memory object using a round-robin selection scheme.

6. A processor comprising:
a memory to store data from an application, wherein the memory comprises a memory corruption detection (MCD) table; and
a processor core coupled to the memory, wherein the processing core is operable to:
receive, from the application, an allocation request for an allocation of one or more contiguous memory blocks of the memory for a memory object;
allocate the one or more contiguous memory blocks for the memory object in view of a size of the memory object requested;
write, into the MCD table, a first MCD unique identifier associated with the one or more contiguous memory blocks;
create a pointer with a memory address of the memory object and a second MCD unique identifier associated with the memory object;
send, to the application, the pointer;
divide the one or more contiguous memory blocks into a plurality of sub-blocks, wherein the plurality of sub-blocks comprise:
an initial sub-block;
one or more middle sub-blocks; and
a last sub-block; and
store data in at least one of a memory allocation meta-data field, a user data field, an overhead data field, or an empty data field, wherein each of the least one of the memory allocation meta-data field, the user data field, the overhead data field, or the empty data field is aligned at a boundary of one of the plurality of sub-blocks.

7. The processor of claim 6, wherein the processor core is further to:
store memory allocation information of the data in the memory allocation meta-data field within the initial sub-block so that the memory allocation meta-data field is aligned with a starting boundary of the initial sub-block;
store user information of the data in the user data field within a first middle sub-block of the one or more middle sub-blocks so that the user data field is aligned with a starting boundary of the first middle sub-block; and
store overhead information of the data in the overhead data field with the last sub-block of the last sub-block so that the overhead data field is aligned with an ending boundary of the last sub-block.

8. The processor of claim 6, the processor core is further to:

store no data in the empty data field within the initial sub-block, wherein the empty data field is aligned with a starting boundary of the initial sub-block;
store memory allocation information of the data in the memory allocation meta-data field within a first middle sub-block of the one or more middle sub-blocks so that the memory allocation meta-data field is aligned with a starting boundary of the first middle sub-block;
store user information of the data in the user data field within a second middle sub-block of the one or more middle sub-blocks so that the user data field is aligned with a starting boundary of the second middle sub-block; and
store overhead information of the data in the overhead data field with the last sub-block of the last sub-block so that the overhead data field is aligned with an ending boundary of the last sub-block.

9. The processor of claim 6, the processor core is further to:
store memory allocation information of the data in the memory allocation meta-data field within the initial sub-block so that the memory allocation meta-data field is aligned with a starting boundary of the initial sub-block;
store overhead information of the data in the overhead data field within a first middle sub-block of the one or more middle sub-blocks so that the overhead data field is aligned with a starting boundary of the first middle sub-block; and
store user information of the data in the user data field with the last sub-block of the last sub-block so that the user data field is aligned with an ending boundary of the last sub-block.

10. The processor of claim 6, wherein the processor core is further to store memory allocation information of the data in the memory allocation meta-data field, user information of the data in the user data field, overhead information of the data in the overhead data field, or no data in the empty data field based on a predetermined sub-block alignment of the processor.

11. A processor comprising:
a memory to store data from an application, wherein the memory comprises a memory corruption detection (MCD) table; and
a processor core coupled to the memory, wherein the processing core is operable to:
receive, from the application, an allocation request for an allocation of one or more contiguous memory blocks of the memory for a memory object;
allocate the one or more contiguous memory blocks for the memory object in view of a size of the memory object requested;
write, into the MCD table, a first MCD unique identifier associated with the one or more contiguous memory blocks;
create a pointer with a memory address of the memory object and a second MCD unique identifier associated with the memory object;
send, to the application, the pointer;
determine the MCD unique identifier associated with the memory object using a random selection scheme; and
verify that the MCD unique identifier is different from another MCD unique identifier of an adjacent contiguous memory block.

12. A system on a chip (SoC) comprising:
a processor;
a memory device coupled to the processor;
a memory controller coupled to the memory device, the memory controller to:
  receive, from an application, a release request for a release of a memory object in a system memory of a processor, wherein the release request comprises a pointer;
  identify a first memory corruption detection (MCD) unique identifier and a memory address of the pointer;
  change the first MCD unique identifier;
  change a second MCD unique identifier in an MCD table of the system memory associated with the memory address of the pointer; and
  release a memory object in the system memory associated with the memory address.

13. The SoC of claim 12, wherein the memory controller is further to change, by the processor, the second MCD unique identifier using a round-robin selection scheme.

14. The SoC of claim 12, wherein the memory controller is further to change, by the processor, the second MCD unique identifier using a random selection scheme.

15. The SoC of claim 14, wherein the memory controller is further to verifying, by the processor, that the second MCD unique identifier is different from another MCD unique identifier of an adjacent contiguous memory block.

16. A method comprising:
  receiving, from an application, an allocation request for an allocation of one or more contiguous memory blocks of the memory for a memory object;
  allocating, by a processor, the one or more contiguous memory blocks for the memory object in view of a size of the memory object requested;
  writing, into a memory corruption detection (MCD) table, a first MCD unique identifier associated with the one or more contiguous memory blocks;
  creating a pointer with a memory address of the memory object and a second MCD unique identifier associated with the memory object; and
  sending, to the application, the pointer;
  determining the second MCD unique identifier associated with the memory object using a random selection scheme; and
  verifying that the second MCD unique identifier is different from another MCD unique identifier of an adjacent contiguous memory block.

17. The method of claim 16, further comprising determining, by the processor the size of the memory object requested by the allocation request.

18. The method of claim 16, further comprising:
  comparing the first MCD unique identifier with the second MCD unique identifier; and
  communicating a corruption detection message to the application when the first MCD unique identifier and the second MCD unique identifier do not match.

19. The method of claim 16, wherein the size of the memory object requested is:
  a first size, wherein the first size is the memory object with a number of contiguous memory blocks below a first threshold amount;
  a second size, wherein the second size is the memory object with a number of contiguous memory blocks that exceeds the first threshold amount and is below a second threshold amount; and
  a third size, wherein the third size is the memory object with a number of contiguous memory blocks that exceeds the second threshold amount.

20. The method of claim 16, further comprising:
  dividing the one or more contiguous memory blocks into a plurality of sub-blocks, wherein the plurality of sub-blocks comprise:
    an initial sub-block;
    one or more middle sub-blocks; and
    a last sub-block; and
  storing data, to be aligned with to each of the plurality of sub-blocks, of at least one of a memory allocation meta-data field, a user data field, an overhead data field, or an empty data field.

* * * * *